(12) United States Patent
Kudo

(10) Patent No.: US 6,666,764 B1
(45) Date of Patent: Dec. 23, 2003

(54) METHOD OF CONTROLLING A CHARACTER IN A VIDEO GAME

(75) Inventor: Shinichi Kudo, Sapporo (JP)

(73) Assignee: Konami Co., Ltd., Tokyo (JP)

( * ) Notice: Subject to any disclaimer, the term of this patent is extended or adjusted under 35 U.S.C. 154(b) by 0 days.

(21) Appl. No.: 09/559,468

(22) Filed: Apr. 26, 2000

(30) Foreign Application Priority Data

Apr. 27, 1999 (JP) .............................................. 11/120728

(51) Int. Cl.[7] .............................................. A63F 13/00
(52) U.S. Cl. .............................................. 463/8; 463/31
(58) Field of Search .............................. 463/1, 2, 7, 8, 463/30–32, 36, 37, 43

(56) References Cited

U.S. PATENT DOCUMENTS

RE35,314 E * 8/1996 Logg .............................. 463/2

OTHER PUBLICATIONS

Kain, Tenchu: Player's Guide, <http://db.gamefaqs.com/console/psx/file/tenchu_a.txt> (Nov. 17, 1998).*
Koa Megura, Final Fantasy VII FAQ, v1.6 (Part One), http://www.ffonline.com/media/guides/ff7/ffvii_faq–walk-through_3_1.txt (1998), pp. 1–92.*
Koa Megura, Final Fantasy VII FAQ, v1.6 (Part Two), http://www.ffonline.com/media/guides/ff7/ffvii_faq–walk-through_3_1.txt (1998), pp. 1–137.*
'Final Fantasy VII', Square Co., Ltd. (Aug. 1, 1997).*
'Final Fantasy—Enemy Skills', <http://www.gamerbase.zophar.net/psx/final_fantasy_vii_p2.htm>.*
'Ultima VII: The Black Gate—The Book of Fellowship', Origin Systems, Inc. (1992), pp. 22,24.*
'Ten Spot, Best Looking Video Games', <http://gamespot.com/gamespot/stories/features/0,12059,2779142–9,00.html>.*
'Azure Dreams', Konami (Jul. 1998).*
'Azure Dreams, Full Spell Index', <http://wws4.ncsu.edu/~bwross/azure/info/spellindex.html>.*
'Oddworld: Abe's Oddysee', GT Interactive (Sep. 1997).*
'Oddworld: Abe's Oddysee', <http://gamespot.com/gamespot/stories/previews/0,10869,2560264,00.html>, (Jun. 4, 1997).*
'Ninja Tools—Smoke Bomb', <http://www.entertheninja.com/ninja_tools/smoke_bomb.html>.*
'Final Fantasy Online', <http://www.ffonline.com/ff7/items.htm>.*
Killer List of Video Games: Gauntlet, http://www.klov.com/G/Gauntlet.html, pp. 1–5.*

* cited by examiner

Primary Examiner—Mark Sager
Assistant Examiner—Steven Ashburn
(74) Attorney, Agent, or Firm—Sughrue Mion, PLLC

(57) ABSTRACT

A method and a video game device are provided which are capable of controlling enemy characters who are originally programmed to attack a main character, to injure each other for a predetermined time period when a user instructs a predetermined action to the main character. The predetermined action may be an action of throwing a smoke screen ball.

5 Claims, 7 Drawing Sheets

22 Character Control Table

| Character | Active Flag | Enemy Flag | Location | Direction | Status |
|---|---|---|---|---|---|
| Main Character A | 1 | 0 | (75,68) | 36° | (9,9,8) |
| Main Character B | 0 | – | – | – | – |
| Ninja A | 1 | 1 | (45,70) | 120° | (2,5,6) |
| Ninja B | 0 | – | – | – | – |
| Ninja C | 1 | 1 | (26,31) | 180° | (7,8,8) |
| Ninja D | 1 | 1 | (48,38) | 206° | (4,5,2) |
| Ninja E | 0 | – | – | – | – |

FIG. 3

| Character | Active Flag | Enemy Flag | Location | Direction | Status |
|---|---|---|---|---|---|
| Main Character A | 0 | – | – | – | – |
| Main Character B | 0 | – | – | – | – |
| Ninja A | 1 | 0 | (29,70) | 135° | (2,5,6) |
| Ninja B | 0 | – | – | – | – |
| Ninja C | 1 | 0 | (35,35) | 201° | (1,1,3) |
| Ninja D | 1 | 0 | (50,40) | 30° | (8,9,2) |
| Ninja E | 0 | – | – | – | – |

22 Character Control Table

FIG. 7

METHOD OF CONTROLLING A CHARACTER IN A VIDEO GAME

BACKGROUND OF THE INVENTION

1. Field of the Invention

The invention relates to a method of controlling a character in a video game and a game device which is capable of executing the method.

2. Description of the Related Art

Nowadays, video game devices are rapidly distributed to many consumers, particularly families. There is a wide variety of games, such as a role-playing game, a simulation game, a combat game, a puzzle game, and the like. Also there are many media, each of which includes a software program that can execute one of these games, are available in store.

Also, there are many types of video game devices to execute the software programs. For example, a home video game device can display images of a game by using a home television monitor. Further, a personal computer or a workstation can also display these images on a CRT display connected thereto. In addition to the devices, there are also game devices in an amusement arcade, each of which includes a display device in its body.

Some games visually represent animated images by successively changing a plurality of different two-dimensional images with time. On the other hand, other games display a virtual three-dimensional space (in other words, a pseudo three-dimensional space) by representing an object with its depth and changing contents of the image, according to a point of view of a main character of the games.

Many of the above mentioned games are combat games. Among them, a sword-play game is popular in which a user (game player) manipulates a main character to defeat ninjas or swordsmen (enemy character), appearing one after another in front of the main character, by using a weapon, such as a sword, and to reach his destination.

In such a game, the pseudo three-dimensional images are often used to represent actions of characters, or the background in more real expressions, and to give the player the feeling of enjoying a live performance.

However, in a popular game, namely a sword-play game, no change is acceptable in the main character manipulated by the player in his fight against the enemy characters (controlled by the other game player). In other words, provision is made for the case where enemy characters fight each other.

For example, if the enemy characters fight each other in a predetermined condition, the main character can defeat the enemies without any effort or can run away from a place where he encounters the enemy. This may result in a decrease of chances of manipulating the main character to fight against the enemy characters and may dampen or lose the player's interest. But, on the other hand, new stories or situations are added to the game, the player may be more interested in the game when a fight among the enemies arises.

SUMMARY OF THE INVENTION

It is therefore an object of the invention to provide a character control method and device which make enemy characters take various actions, in various manners, and in a predetermined condition.

It is another object of the invention to provide a character control method and device which can not determine in the predetermined condition whether the character encountered is an enemy or not.

According to a first aspect of the invention, there is provided a method of controlling fight between a main character, as manipulated by a user, and enemy characters that are programmed to attack the main character in a video game. The method comprises the steps of receiving instructions from the user, and controlling one of the enemy characters to attack other enemy characters in response to a predetermined instruction from the user.

According to a second aspect of the invention, there is provided a method of controlling fight between a main character manipulated by a user and enemy characters programmed to attack the main character in a video game. The method comprises the steps of preparing enemy flags, each of which corresponds to a character in the video game and shows whether the corresponding character is an enemy or not for the enemy characters other than the corresponding character, determining a first enemy character as an attack object of the other enemy characters if the first enemy character has an enemy flag showing that the first enemy character is an enemy, and changing a value of the enemy flag of the first enemy character from a value showing that the first enemy character is not an enemy to a value showing that the first enemy character is an enemy, when the user issues a predetermined instruction.

According to a third aspect of the invention, there is provided a video game device which is capable of controlling fight between a main character manipulated by a user and enemy characters programmed to attack the main character in a video game. The video game device comprises a character control table which includes an enemy flag for each character, the flag showing whether the corresponding character is an enemy or not for the enemy characters other than the corresponding character, an attack objects determining device which determines a character having an enemy flag showing that the character is an enemy, as an attack object of the enemy characters other than the character, and an enemy flag changing device which changes a value of the enemy flag of an enemy character from a value showing that the enemy character is not an enemy to a value showing that the enemy character is an enemy, when the user make a predetermined instruction.

According to a fourth aspect of the invention, there is provided a recording medium readable by a computer, tangibly embodying a program of controlling fight between a main character manipulated by a user and enemy characters programmed to attack the main character in a video game. The program comprises the steps of receiving instructions from the user, and controlling one of the enemy characters to attack other enemy characters in response to a predetermined instruction from the user.

According to a fifth aspect of the invention, there is provided a recording medium used in a video game device including a CPU and readable by the CPU, the recording medium including enemy flags each of which corresponds to a character and shows whether the corresponding character is an enemy or not for the enemy characters other than the corresponding character.

BRIEF DESCRIPTION OF THE DRAWINGS

FIG. 3 shows contents of a character control table according to the embodiment of the invention when the image shown in FIG. 2 is displayed;

FIG. 7 shows contents of the character control table after the main character throws the smoke screen ball.

DESCRIPTION OF THE PREFERRED EMBODIMENT

Figure 1:
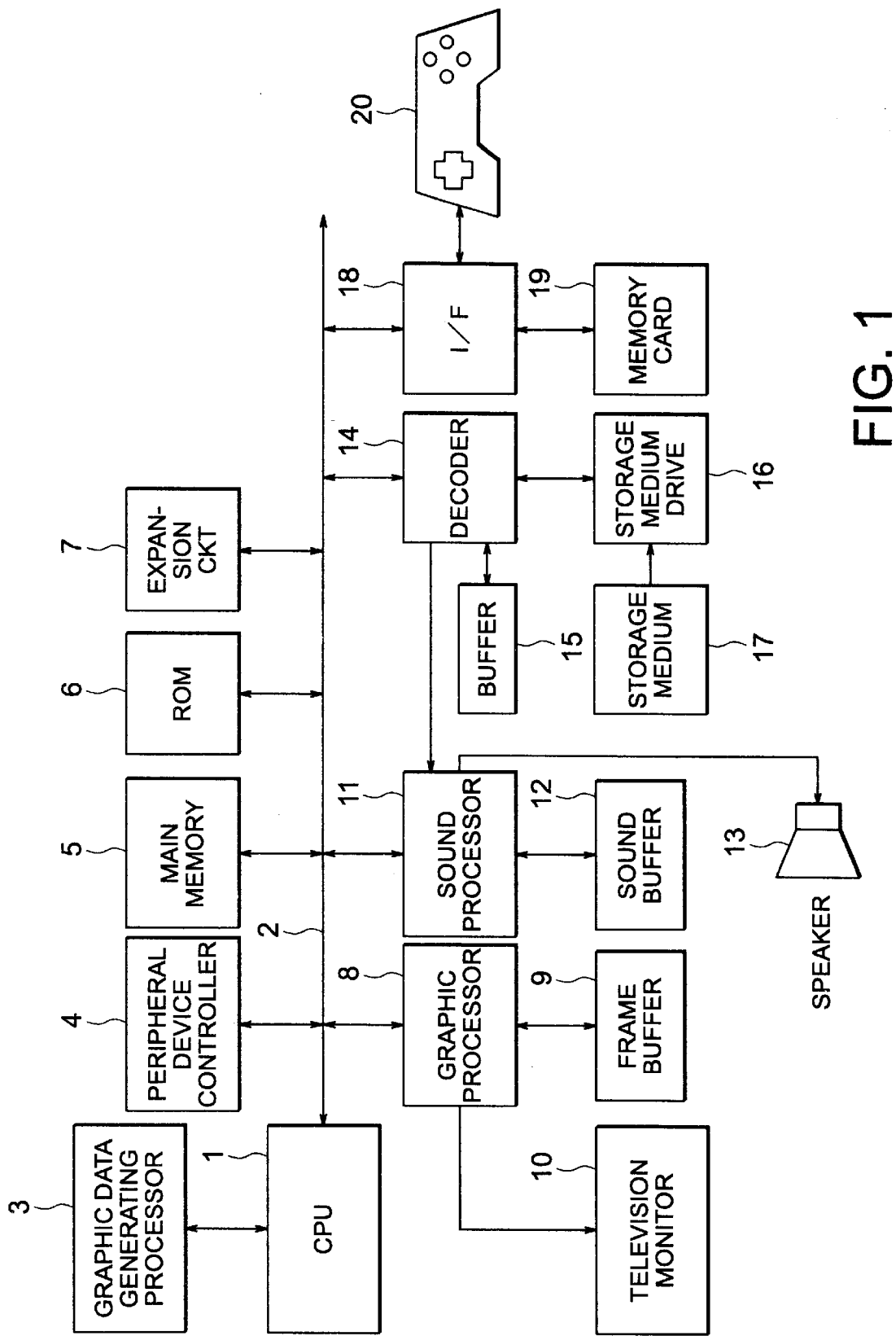
FIG. 1 shows a block diagram of a video game device according to an embodiment of the invention.

Referring to FIG. 1, description is at first made about a video game device of an embodiment of the invention. As described above, there are various types of video game devices. Therefore, the video game device shown in FIG. 1 is merely exemplified and may be changed to any other game devices or machines.

The video game device shown in FIG. 1 includes a body, a television monitor 10, a speaker 13, a memory card 19, and a controller 20 are connected to the body, The game device is suited for home use.

The body includes a CPU 1, a bus 2 connected to the CPU 1, and some elements connected to the bus 2.

The bus 2 includes an address bus, a data bus, and a control bus. A graphic data generating processor 3, a peripheral device controller 4, a main memory 5, a ROM 6, an expansion circuit 7, a graphic processor 8, a frame buffer 9, a sound processor 11, a sound buffer 12, a decoder 14, a buffer 15, a storage medium drive 16, and an interface circuit 18.

The television monitor (hereinafter, referred to as a "monitor") is connected to the graphic processor 8. Further, the speaker 13 is connected to the sound processor 11, and the memory card 19 and the controller 20 are connected to the interface circuit 18.

A storage medium 17 stores a program and image data required to play a game. The program and the image data are read from the storage medium 17 to a video game device via the storage medium drive 16. The storage medium itself is, for example, a CD-ROM or an optical disk.

As mentioned above, the video game device shown in FIG. 1 is an example suited for home use. In this case, it is general that the monitor of a home television is used as the monitor 10 and a speaker of the home television is used as the speaker 13.

In the case where the method according to the invention is applied to the arcade game device, the above mentioned elements shown in FIG. 1 may be all incorporated into a single body.

Also, when the method of the invention is used in a personal computer of a workstation, a CRT display connected to the personal computer may be used as the monitor 10, and an input device such as a keyboard or a mouse is used as the controller 20.

Now, description is made about the game device in more detail.

The CPU 1 is, for example, a 32-bits RISC (reduced instruction set computer), and controls all elements of the game device by executing an operating system program stored in a ROM 6, which is described later.

The graphic data generating processor 3 serves as a co-processor of the CPU 1. That is, the processor 3 executes calculation for coordinate transformation and a light source, for example, operation of fixed decimal or vector, with parallel processing to display a pseudo three-dimensional image.

The peripheral device controller 4 executes control operation for interruption, time, memory, and direct memory access (DMA) transfer. The ROM 6 stores, as described above, the operating system program which controls operations of the elements in the game device.

The expansion circuit 7 decodes still or animated image data read out from the storage medium 17 and stored in the main memory 5, under the control of the aforementioned CPU 1, and stores the decoded image data back in the main memory 5. Specifically, the expansion circuit 7 is capable of carrying out high-speed execution of inverse discrete cosine transform (inverse DCT) operations, and it is also capable of expanding compressed data read out from the storage medium 17 in accordance with still color image compression standards (known as JPEG) or cumulative media moving image encoding standards (known as MPEG).

The graphic processor 8 renders polygon images and stores them into the frame buffer 9 in response to instructions from the CPU 1.

The frame buffer 9 includes a display area and a non-display area. The display area is an area for storing images corresponding to a display area on the monitor. The non-display area is an area for storing animation images used to produce two-dimensional images in the display area and textures used to produce pseudo three-dimensional images.

In some case, the frame buffer 9 includes a color lookup table (CLUT) which corresponds a color of pixel to a number. Also, data in the display area in the frame buffer 9 are transferred to the monitor 10 at high-speed. The frame buffer 9 consists of a so-called dual-port RAM, and it is capable of simultaneously receiving images from the graphic data generating processor 3 (CPU 1) or transferring data from the main memory 5, and reading out data in order that the data can be displayed to the monitor 10.

The sound processor 11 outputs music or an effective sound via speaker 13 by regenerating ADPCM data in the storage medium 17 or voice data stored in the sound buffer 12, or by modulating and regenerating the voice data.

The decoder 14 decodes a program or data which are stored in the storage medium 17 and are appended an error correction code (ECC), and provides the program or the data to the main memory 5 or the sound processor The buffer 15 temporarily stores the program and/or data regenerated from the storage medium 17. The buffer 15 has a memory capacity of, for example, 32 kilobytes.

The storage medium drive 16 may be a CD-ROM drive, an optical disk drive, or the like. The storage medium drive 16 reads a program and another data out of the storage medium 17, and provides them to the decoder 14.

The interface circuit 20 sends an operation signal received from the controller 20 to the CPU 1. Also, the interface circuit 20 reads out the contents of the memory card 19 to supply the contents to the main memory 5, and simultaneously stores data into the memory card 19 in response to an instruction of the CPU 1.

The memory card 19 stores values of a various of parameters in order to, for example, maintain the status at the time point when a game terminates last time. Herein, a card type memory is used as the memory card 13 in the illustrated example, but many types of memories may be used.

The controller 20 is manipulated to play a game by a user. The controller 20 includes direction buttons for moving a character on the monitor upwards, downwards, leftwards and rightwards, and a plurality of function buttons for instructing one of specific functions, for example, starting the game or selecting items.

Next, description is made about an embodiment of the invention with reference to FIG. 2 through FIG. 7.

Figure 2:
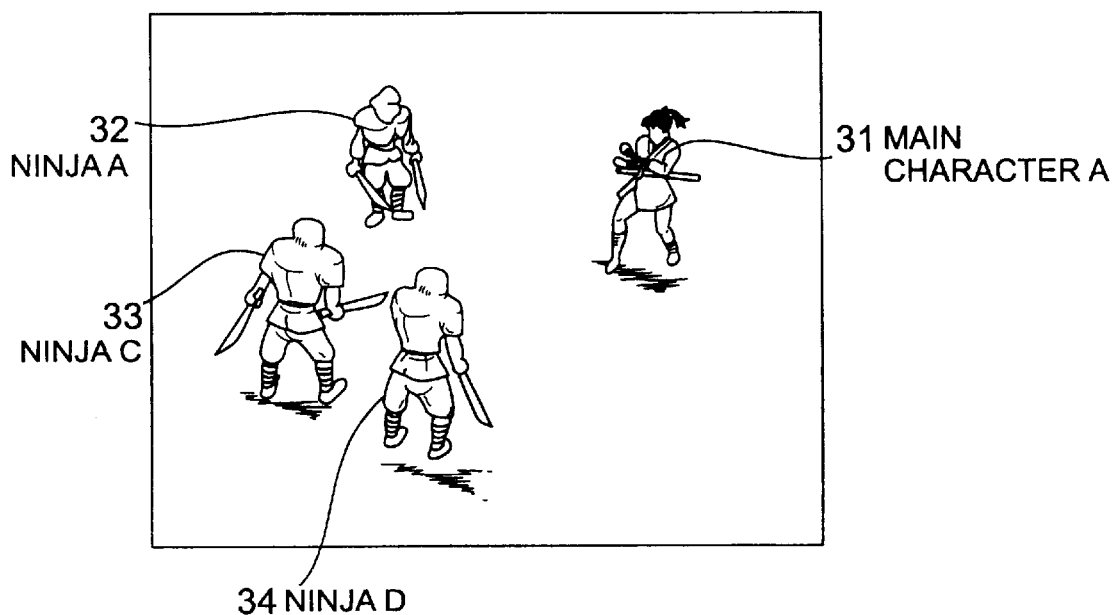
FIG. 2 shows a pseudo three-dimensional image in a time point in an embodiment of the invention.

In FIG. 2, a scene in the game is shown, wherein the main character is faced with enemy characters prepared for fighting. A user (game player) controls actions of the main character A 31 to defeat the enemy characters (ninjas A 32, C 33, and D 34) by using the controller 20. The main character A 31 can select a desired weapon, and beats the enemy characters with the weapon, for example, a sword. When the main character A 31 defeats all the enemy characters, the main character A 31 proceeds to the next stage according to the game story. In this event, another background image is displayed or new enemy characters appears. Thereafter, whenever the main character A 31 defeats the enemy characters, situation is changed to the next stage and, finally, when all the stages are cleared, the main character A 31 reaches a destination. On the contrary, when the main character A 31 is defeated by the enemy characters, the game is over or another main character is revealed.

In FIG. 3, a character control table 22 includes values which correspond to status of the characters at a time point shown in FIG. 1. The table 22 includes, for each character, an active flag, an enemy flag, location information, direction information, and status, and all information is updated on displaying an image at a predetermined timing. The active flag shows whether or not the corresponding character appears in the present scene of the game, specifically, the value "1" means that the character is present in the scene, and the value "0" means that the character is absent. In this example, one of the main character (A) is selected by the user, and three of the enemy characters (A, C, and D) come out in the game screen to beat the main character A under control of the game program.

The enemy flag shows whether the corresponding character is an enemy or not. In general, when the character is an enemy against the main character, the value "1" is set to the enemy flag, and when the character is on the main character's side, the value "0" is set. In this example, the ninjas A, C, and D are enemy characters, who try to defeat the main character A.

The location information includes coordinates indicating the locations of the characters in the game screen. The coordinates are, for example, represented by using the center of gravity of one character in the two-dimensional X-Y axis. In this case, the bottom line of the game screen is considered as the X axis, and the left side of the game screen is considered as the Y axis. The character may be controlled by a plurality of points determined in relation to the character, that is, a plurality of pairs of coordinates. Also, three-dimensional coordinates may be used.

The direction information shows the direction of the character, in particular, the direction of the face of the character. In this example, the reference line is set to a line parallel to the bottom line of the game screen. Then the direction is represented by an angle between the reference line and a character line parallel to the direction of the character measured from the character line clockwise. In this example, the main character A shown in FIG. 1 looks toward the lower left and thus measured angle is 31 degrees.

The status shows physical strength, emotional strength, and experience of the corresponding character. In this example, physical strength, emotional strength, and experience of the main character A are equal to 9, 9, and 8, respectively. As the maximum value, 10 is set to each value, and as the minimum value, 0 is set. These values are reduced whenever the main character is attacked by the enemy characters. When one of the values falls short of a predetermined value, the corresponding character is considered to be defeated and removed away from the game screen.

When the value of the active flag is "0", the enemy flag, the location information, the direction information, and the status of the character corresponding to the active flag are not set since the character does not appear in the game screen.

Figure 4:
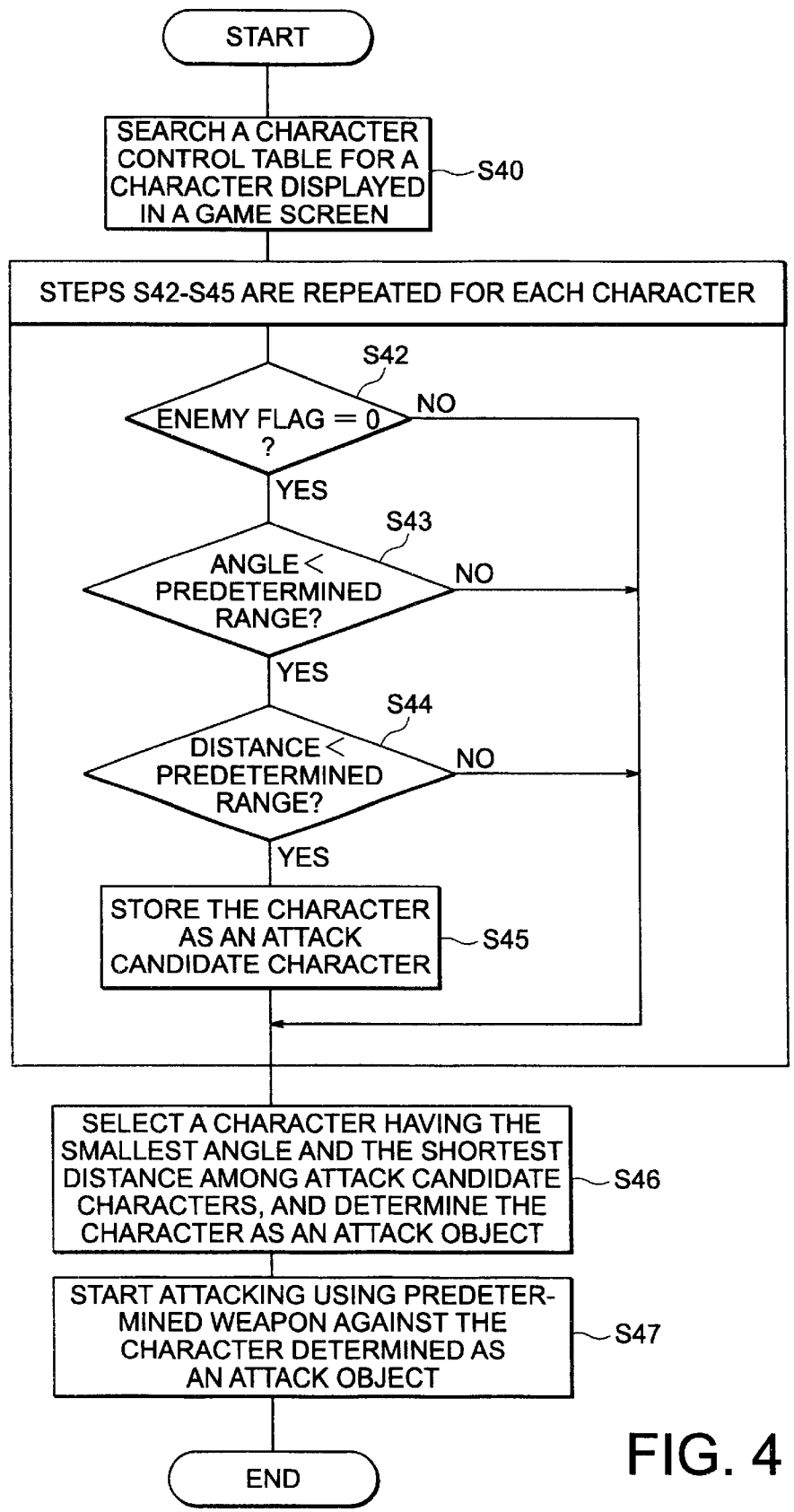
FIG. 4 shows a flowchart representing an actions of an enemy character to determine whether a character is an enemy or not.

The flowchart shown in FIG. 4 is applied to each enemy characters (ninjas A, C, and D) shown in FIG. 2.

At first, in step S40, the active flag of the value "1" is searched in the character control table 22 as shown in FIG. 3. Then, the characters which appear in the present scene are identified as attack candidate characters. But, the own objective character is omitted from these candidate characters. Therefore, for example, for processing on the ninja A, the main character A 31, the ninjas C 33 and D 34 are selected as attack candidate characters.

Next, for each attack candidate character thus selected, steps 42 through 45 are repeated and it is determined whether or not each attack candidate character is an object of attack.

In step S42, it is determined whether the enemy flag of the attack candidate character is "0" or not. If the enemy flag is "1", the attack candidate character is not the enemy character, the attack candidate character is omitted from attack objects, and determination is started about the next attack candidate character. On the other hand, if the enemy flag is "0", the attack candidate character may be an enemy, the process proceeds to step S43. Herein, considering process for the ninja A on the basis of the above determination, the ninjas C 33 and D 34 are omitted from the attack objects since their enemy flags are "1", and the main character A 31 is left as the attack candidate character.

In step S43, it is determined whether relative angle between the attack candidate character and the enemy character (that is, angle between two characters who are faced with each other) falls into a predetermined range or not. This means that the enemy character does not attack the character who turns back on the enemy character or passes through by the enemy character. When the relative angle is out of the predetermined range, the attack candidate character is omitted from the attack objects, the process proceeds to the next determination. When the relative angle falls into the predetermined range, the attack candidate character may be included in the attack objects. Therefore, the process proceeds to step S44 and then an additional determination is carried out.

The additional determination in step S44 is to determine whether the distance between the attack candidate character and the enemy character falls within a predetermined range or not.

This serves to prevent the enemy character from being removed from an attack candidate character different from the enemy character and to express a real combat situation. When the distance exceeds the predetermined range, the attack candidate character is not selected as the attack objects, and the process proceeds to the next step.

The relative angle falls within the predetermined range, the attack candidate character is finally stored as the attack objects in step S45. Herein, consideration is made about the ninja A. When the main character A 31 faces to the ninja A at the predetermined angle (which is determined in step S43) or when the distance between the main character A 31 and the ninja A is less than the predetermined distance (which is determined in step S44), the ninja A has no attack objects.

The above determinations are repeated for each attack candidate character. Thereafter, a character having the smallest distance to the enemy character and the smallest relative angle to the enemy character is selected among the attack candidate characters in step S46. Then, in step S47, the enemy character attacks the selected attack candidate character using a predetermined method. The number of the attack candidate characters to be selected is not limited to one. The enemy character may select a plurality of attack candidate characters in accordance with differences of attacking methods. Further, another condition to determine the attack candidate character may be used.

As described above, when each of the ninjas C 33 and D 34 (enemy characters) shown in FIG. 2 recognizes the main character A 31 as the attack object, the ninja A 32 does not attack the main character A 31 and the ninjas C 33 and D 34 attack the main character A 31 using each attacking method.

Figure 5:
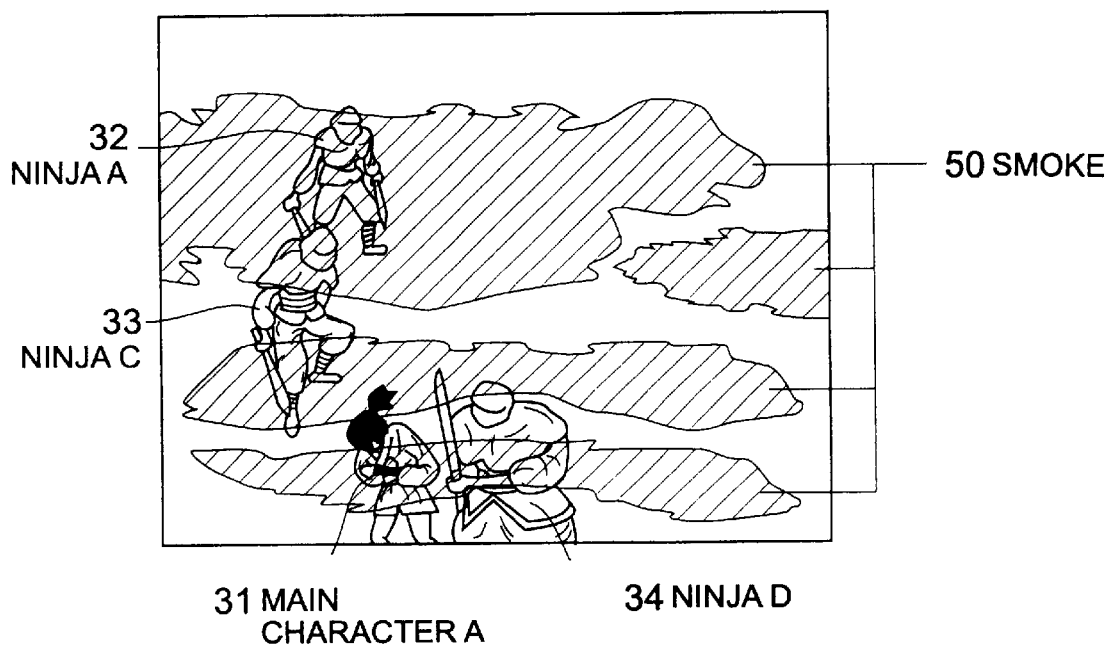
FIG. 5 shows a pseudo three-dimensional image immediately after a main character throws a smoke screen ball.

In this situation, when the ninjas C and D attack the main character A 31, the main character can fight back the ninjas C and D (and ninja A, if meet the condition later). For example, the main character A 31 throws a smoke screen ball and confuses the enemy characters, thereby, he can run away from the situation. This is shown in FIG. 5. In FIG. 5, the whole place in the video game screen is filled with a smoke screen 50 caused by the thrown smoke screen ball. And the main character A 31 escapes toward the lower left of the video game screen. Further, in the video game screen, it is clear that the enemy characters (ninjas) A, C, and D lose sight of the main character and are all confused.

Figure 6:
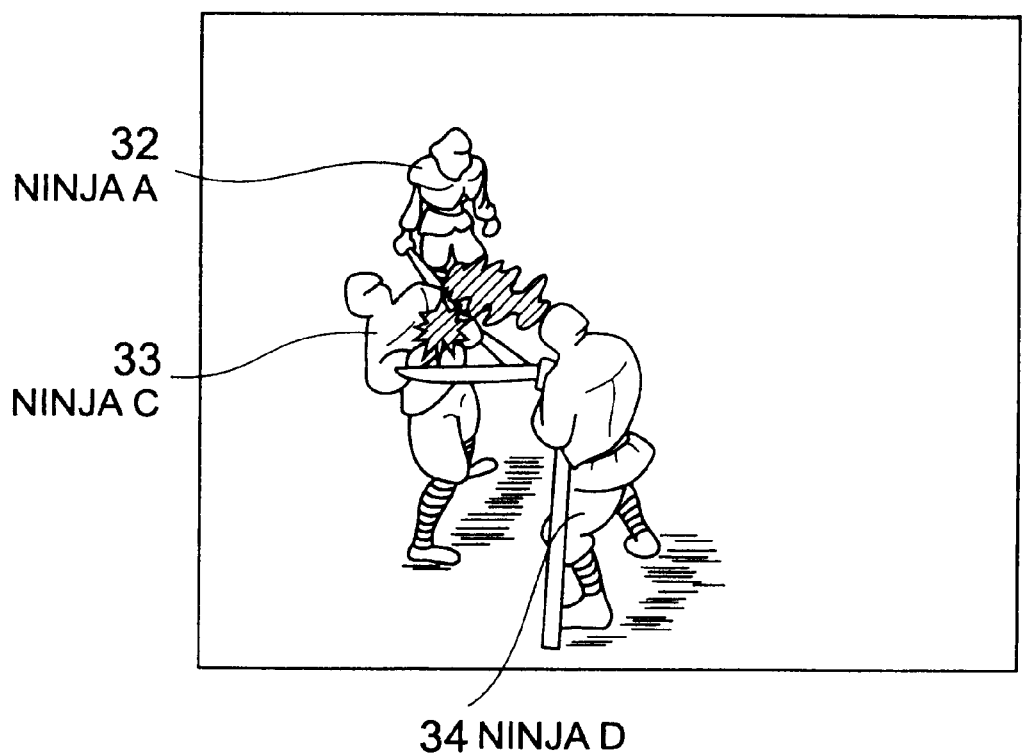
FIG. 6 shows a pseudo three-dimensional image a time period after the main character throws the smoke screen ball.

After that, the ninjas A, C, and D who lose the sight of the main character attack each other using sword without distinction between enemy and comrade as shown in FIG. 6.

Such a situation is realized by changing some values in the character control table when the smoke screen ball is thrown. Hereinafter, the process is described.

When the user directs the main character A 31 to throw the smoke screen ball by manipulating the controller 20, on the video game screen, action of the main character throwing the smoke screen ball and smoke 50 from the ball are displayed (FIG. 5). Simultaneously, as shown in FIG. 7, enemy flags of the enemy characters (ninjas A, C, and D) in the character table 22 are all set to zero. Values of the other items in the table 22 are changed, but the changes are inevitably required according to the character's action and it is no need to pay any attention.

Herein, when the determining process described above in connection to the flowchart shown in FIG. 4 is carried out by each of the enemy characters (ninjas A, C, and D), it is determined that a character to be originally recognized as comrade is recognized as attack candidate characters since values of the enemy flags corresponding to the other ninjas are set to zero and meets the above mentioned condition of determining attack candidate character. Subsequently, each of the enemy characters (ninjas A, C, and D) injures each other by using sword.

Next, to limit effects of throwing the smoke screen ball, each value of the enemy flags of the enemy characters in the character control table is set back to one, after a predetermined time period is elapsed from the throwing of the smoke ball. Thereby, each of the enemy characters (ninjas A, C, and D) can correctly determine whether each of the characters is an enemy or not.

Therefore, for the predetermined time period after the smoke screen is thrown, the enemy characters can be controlled to injure each other. Further, at this time, if the main character A 31 meets a condition, for example, the distance between the main character and an enemy character falls within a predetermined range, the enemy character will attack other enemy characters and the main character A as shown in FIG. 4. On the contrary, it is possible to control the enemy character not to attack the main character A by amending the flowchart shown in FIG. 4 or the character control table when the smoke screen ball is thrown.

In the above description, one embodiment of the invention has been shown using video game screens, table, and flowchart in connection to a series of scenario. But, they are merely illustrated and other screens, another table, and another flowchart may be used.

According to the invention, enemy characters which are originally programmed to attack the main character are controlled to injures each other for a predetermined time period when user instructs the main character to throw the smoke screen ball.

What is claimed is:

1. A video game device which is capable of controlling fight between a main character manipulated by a user and enemy characters programmed to attack the main character in a video game, the video game device comprising:

a character control table which includes an active flag for showing whether or not the corresponding character appears in a present scene and an enemy flag for each character, the enemy flag showing whether the corresponding character is an enemy or not for the enemy characters other than the main character;

an attack objects determining device which determines a character having an enemy flag showing that the character is an enemy, as an attack object of the enemy characters other than the character; and an enemy flag changing device which changes a value of the enemy flag of an enemy character from a value showing that the enemy character is not an enemy to a value showing that the enemy character is an enemy, when the user makes a predetermined instruction, wherein the attack objects determining device further determines the character having the enemy flag showing that the character is an enemy, as an attack object of the enemy characters other than the character, when the distance between the character and one of the enemy characters falls within a predetermined range and the relative angle facing the character with the one of the enemy characters falls within a predetermined range, wherein the predetermined instruction is operative to make the main character throw a smoke screen ball to cause a smoke screen to occur between the main character and the enemy character;

wherein the enemy flag changing device is operative, in conjunction with the throwing the smoke screen ball and the resulting occurrence of the smoke screens to change the enemy flag value for a character as determined by the attack objects determining device, to thereby render the flag changed character into a non-enemy character, only when the character appears in the present scene, which is specified by the active flag, and wherein the main character escapes from the present screen and characters with enemy flags attack characters with flags changed from enemy flags.

2. The video game device of claim 1, wherein the character control table includes, for each character in the video game, an active flag which shows whether the corresponding character is presently displayed in the video game or not, a location of the character, a direction of the character, and a status of the character.

3. The video game device of claim 2, wherein the enemy flag changing device is operative, after a predetermined time that corresponds to the dissipation of a smoke screen, to change the value of the enemy flag to one corresponding to the character being an enemy character.

4. The video game device of claim 1, wherein the enemy flag changing device is operative, after a predetermined time that corresponds to the dissipation of a smoke screen, to change the value of the enemy flag to one corresponding to the character being an enemy character.

5. The video game device of claim 1, wherein the effect of the change of enemy character enemy flags is to prevent such characters from attacking the main character.

\* \* \* \* \*